Dec. 22, 1936.  G. H. J. BAULE  2,065,040
AUTOMATIC TRANSMISSION
Filed July 25, 1934  6 Sheets-Sheet 1

Fig-1.

INVENTOR:
Gerhard H. J. Baule,
BY
ATTORNEYS.

Dec. 22, 1936.  G. H. J. BAULE  2,065,040
AUTOMATIC TRANSMISSION
Filed July 25, 1934  6 Sheets-Sheet 3

FIG_3_

FIG_6_

INVENTOR:
Gerhard H. J. Baule,
BY
ATTORNEYS

Dec. 22, 1936.   G. H. J. BAULE   2,065,040
AUTOMATIC TRANSMISSION
Filed July 25, 1934   6 Sheets—Sheet 4

FIG_4_

INVENTOR:
Gerhard H. J. Baule,
BY
Bodell & Thompson.
ATTORNEYS.

Dec. 22, 1936.  G. H. J. BAULE  2,065,040
AUTOMATIC TRANSMISSION
Filed July 25, 1934  6 Sheets-Sheet 5

INVENTOR:
Gerhard H. J. Baule,
BY
ATTORNEYS.

Dec. 22, 1936.  G. H. J. BAULE  2,065,040
AUTOMATIC TRANSMISSION
Filed July 25, 1934  6 Sheets-Sheet 6

FIG_9_

INVENTOR:
Gerhard H. J. Baule,
BY
ATTORNEYS.

Patented Dec. 22, 1936

2,065,040

UNITED STATES PATENT OFFICE 2,065,040

AUTOMATIC TRANSMISSION

Gerhard H. J. Baule, Syracuse, N. Y., assignor of one-half to Grace I. Haley, Syracuse, N. Y.

Application July 25, 1934, Serial No. 736,914

8 Claims. (Cl. 74—336)

This invention relates to change speed transmission gearing for varying the speed ratio between a driving and a driven member and more particularly to change speed transmission gearing for use in motor vehicles for transferring the power of the motor or engine to the propeller shaft of the vehicle, and is an improvement of the transmission gearing forming the subject matter of my copending application, Sr. No. 681,155, filed July 19, 1933.

The invention has for its object a change speed transmission, the operation of which is automatically effected by the torque action of the motor and the torque reaction of the vehicle or changes in either, and in which the torque required to effect such operation must reach a value depending on and varying with the speed of the vehicle.

Another object of the invention is to provide a torque-speed controlled change speed transmission having the general arrangement of a three-speed forward transmission including direct drive, or high speed, intermediate or second speed and low speed, and also having the conventional reverse gearing, and in which the reduced speeds are obtained through gearing arranged in the same manner as in the conventional manually operated constant-mesh transmissions, in which the drive shaft drives a countershaft which in turn actuates the propeller, or tail, shaft of the transmission through proper gearing.

A further object is to provide an automatic multiple-ratio transmission having a normally engaged torque-responsive, or overload, clutch means associated with each ratio but the lowest one, so that in a three-speed forward transmission one overload clutch means is provided to normally connect the drive and driven shafts in direct drive or one-to-one ratio and a second normally engaged overload clutch means is provided to connect the drive and driven shafts through intermediate or second speed gearing when the first overload clutch means has become disengaged.

A further object is to provide an automatic transmission in which each torque-responsive normally engaged overload clutch means includes means responsive to the speed of the driven member or shaft for opposing the disengagement of the clutch means by torque.

A further object is to provide an automatic transmission having a torque-responsive overload clutch means associated with each ratio but the highest one, in which the overload clutch means are interconnected with each other and with the lowest driven gear in such a manner that when driving through a ratio greater than the lowest, the preceding overload clutch or clutches are held disengaged by the torque transmitted through said lower ratio.

A further object is to provide an automatic transmission in which the torque-speed responsive clutches will not disengage after the driven shaft has reached certain speeds.

A further object is to provide an automatic multiple-ratio transmission in which the drive is intermitttent during the period when the drive changes from one ratio to another while the driven shaft is in motion.

Other objects will be apparent from the specification.

The invention consists in the novel features and in the combinations and constructions hereinafter set forth and claimed.

In describing this invention, reference is had to the accompanying drawings in which like characters designate corresponding parts in all the views.

This automatic change speed transmission gearing includes, generally, driving and driven elements, a normally engaged clutch for transmitting the rotation of the driving element to the driven element in direct drive relation, normally idling reduction gearing between the driving and driven elements for transmitting the rotation of the driving element to the driven element at a higher ratio when the clutch has become disengaged, the clutch being disengageable by the load on the driven element when said load reaches a value which depends on and varies with the speed of the driven element, and the clutch being held disengaged by the torque transmitted to the driven element at said higher ratio.

Figure 1:
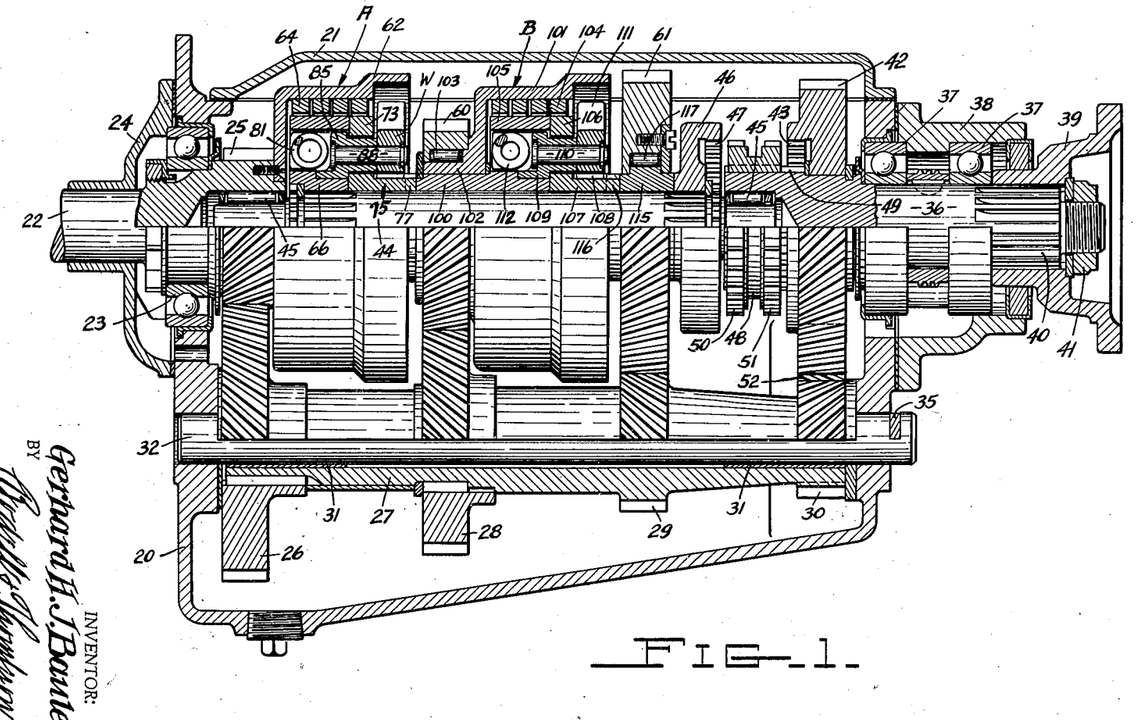
Figure 1 is a central, longitudinal, vertical, sectional view taken through the transmission housing, the transmission mechanism in the housing being shown partly in section, partly in elevation.

The transmission is mounted in a conventional gear box or housing 20 provided with a detachable cover plate 21. The stud shaft 22, to the left Figure 1, is connected to the crank shaft of the motor through a conventional clutch, and constitutes the driving shaft of the transmission. The stud shaft 22 is mounted in the forward end of the housing 20 in a suitable bearing 23 which is held in place by a detachable cap 24. The inner end of the stud shaft 22 is formed, or provided, with a driving gear 25 which is arranged in constant mesh with a gear 26 mounted on the hollow countershaft 27 which extends parallel to the axis of the stud shaft 22, the gears 28, 29 and 30 being also secured to and rotatable with the countershaft 27. Preferably, the countershaft 27 and the gears 26, 28, 29 and 30 are formed integral, the ends of the bore of the countershaft being provided with suitable bushings 31 to form bearings for rotation of the countershaft 27 on a shaft 32.

The shaft 32 is held from endwise movement relative to the housing 20 by any suitable means, such as a retainer 35 secured to the outer end wall of the housing. A tail shaft 36 is mounted in suitable bearings 37 in the rear end wall of the housing 20 and in a detachable cap 38. The outer end of the tail shaft 36 is provided with a coupling 39 for attachment to the universal joint on the propeller shaft of the car. The flange 39 is secured to the tail shaft by means of the splines 40 and nut 41 in the conventional manner. The tail shaft 36 is arranged coaxially with the stud shaft 22, and the inner end extends into the housing 20 toward the stud shaft 22 and carries gear 42 which is rotatably mounted thereon, and which is provided with an internal clutch face as at 43. Both the stud shaft 22 and the tail shaft 36 are provided with internal concentric bores which receive the ends of an intermediate shaft 44. The ends of the intermediate shaft 44 are provided with suitable antifriction bearings 45.

Figure 2:
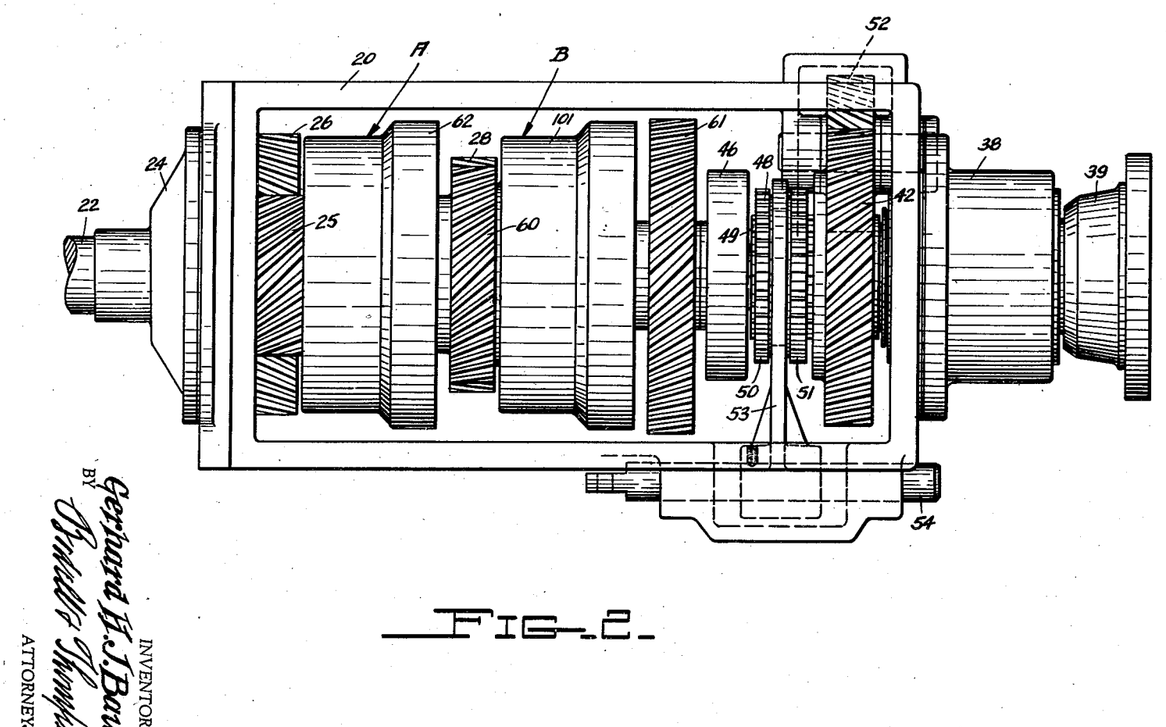
Figure 2 is a plan view of the transmission with the cover of the housing removed.
Figure 3:
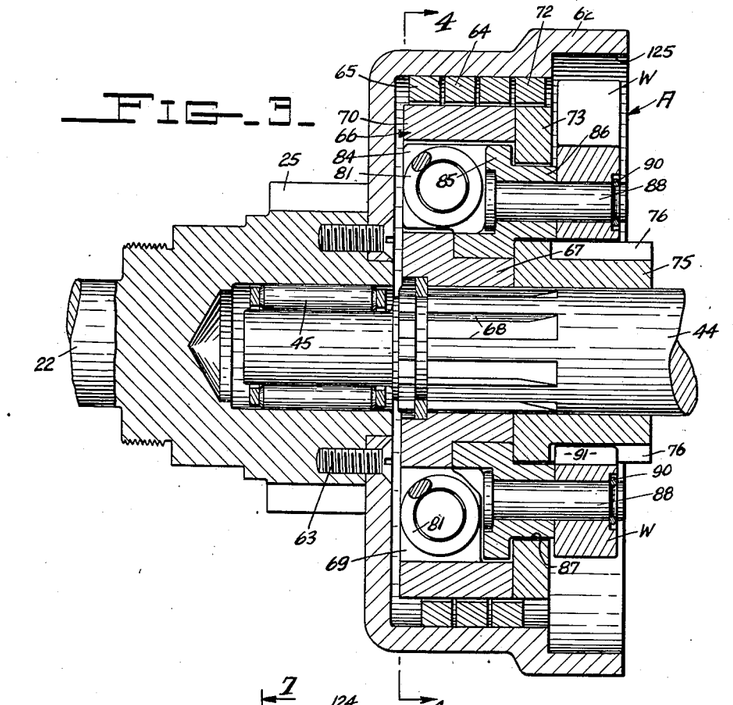
Figure 3 is an enlarged, sectional view of one of the clutches of the transmission.

A clutch member 46 is secured to the intermediate shaft 44 toward the rear end thereof, and provided with internal clutch face 47. A clutch member 48 is slidably mounted upon the inner end of the tail shaft 36 and secured thereto by means of splines 49. The clutch member 48 is provided with clutch faces 50, 51. The clutch members 46, 48 and gear 42 are all arranged coaxial and so as to permit the clutch member 48 to be shifted axially of the tail shaft 36 to effect engagement of the clutch faces 47, 50, or 43, 51. The clutch member 48 is shifted manually by means of fork 53 secured to shift rod 54 which is slidably mounted in the housing 20, as shown in Figure 2.

The gear 42 is rotatably mounted upon the tail shaft 36 and is in constant mesh with an idler gear 52 which in turn is in constant mesh with the gear 30 of the countershaft 27. When the clutch member 48 is shifted rearwardly, or to the right Figure 1, the tail shaft is reversed in rotation relative to the stud shaft 22 to effect reverse movement of the car. When the clutch member 48 is shifted forwardly, or to the left Figure 1, the tail shaft 36 is connected to the intermediate shaft 44, which is the driven shaft of the transmission and which in turn is connected to the stud shaft 22 through the gearing and clutches of the transmission, as will be hereinafter explained.

The intermediate shaft 44 is operatively connected to the stud shaft 22 through the clutches designated generally A and B. Clutches A and B are so designed, or formed, that they are normally engaged and their disengagement is controlled partially by the load on the driven shaft and partially by the speed of the driven shaft. Clutch A releases, or becomes disengaged previous to the disengagement of clutch B. When both clutches A and B are engaged, direct drive is effected from the stud shaft 22 through the intermediate shaft 44, to the tail shaft 36. When the load on the tail shaft 36 and the intermediate shaft 44, under this condition, reaches a certain value, clutch A becomes disengaged and the stud shaft 22 then becomes connected to the intermediate shaft 44 through gears 28, 60, the drive then being through the stud shaft 22, gears 25, 26, 28, 60, clutch B, driven section of clutch A, intermediate shaft 44 and tail shaft 36. This corresponds to the conventional second gear in the regular automobile transmission.

If while driving through the second gear the load on the tail shaft 36 and the intermediate shaft 44 reaches a certain value, clutch B also becomes disengaged and the drive is through stud shaft 22, gears 25, 26, 29, 61, driven sections of the clutches B and A, to intermediate shaft 44, and tail shaft 36. This drive corresponds to third, or low gear in the standard automobile transmission. Reverse movement is effected by manually shifting the clutch member 48, as previously explained.

Clutch A

A drum 62 is secured to the drive shaft 22 as by screws 63. The drum 62 constitutes the driving section of the clutch A, the other or driven section including an expansible and contractible clutch member or band or coil 64 arranged inside of the drum 62 and normally engaging the inner surface thereof and having one end 65 secured to a driven member 66. The member 66 is provided with a hub portion 67 having a bore provided with splines complemental to the splines 68 formed on the forward end of the intermediate shaft 44. A web 69 connects the hub 67 with the rim or drum portion 70 which is arranged in the bore of the coil 64. The end 65 of the coil 64 is secured to the driven member 66 as at 71, Figure 4. The other end 72 of the coil 64 is secured to a member or disk 73 as at 74, Figure 5. The disk 73 is provided with a hub portion 75 rotatably mounted upon the intermediate shaft 44 and provided with gear teeth 76, and on its outer end with jaw clutch faces 77, Figure 5. The inner end of the hub 75 abuts against the hub 67 of the driven member 66.

The web 69 of the driven member 66 is provided with recesses 80 having helical compression springs 81 mounted therein with one end of the springs pressing against the end of the recess 80 as at 83, and the opposite end pressing against an abutment 84 formed on an element or ring 85. The ring 85 is interposed between the hub 67 and the drum 70 of the driven member 66. The ring 85 is provided with rearwardly projecting bosses 86 projecting through slots 87 formed in the disk 73. The bosses 86 carry pins 88 which project outwardly and centrifugal weights W are rotatably mounted on the outer ends of the pins 88, and the weights W are held on the outer ends of the pins 88 by means of a snap ring 90. The weights W are provided with gear teeth 91 which mesh with gear teeth 76 formed on the hub 75 of disk 73.

It will be observed that when the enlarged portions of the weights W move outward radially because of centrifugal action, relative movement is effected between the disk 73 and the ring 85. This movement effects a partial compression of the coil springs 81. The parts normally rotate in the direction indicated by the arrows, Figures 4 and 5.

It will be observed that the driven member 66 is secured directly to the intermediate shaft 44 by means of the splines 68. The end 65 of the coil 64 is secured to the member 66, the opposite end 72 of the coil 64 being secured to the movable member 73. The coil compression springs 81 tend to rotate the member 66 and the member 73 in opposite directions, and thereby normally maintain the coil 64 in expanded condition or in engagement with the inner surface of the drum 62.

Figure 4:
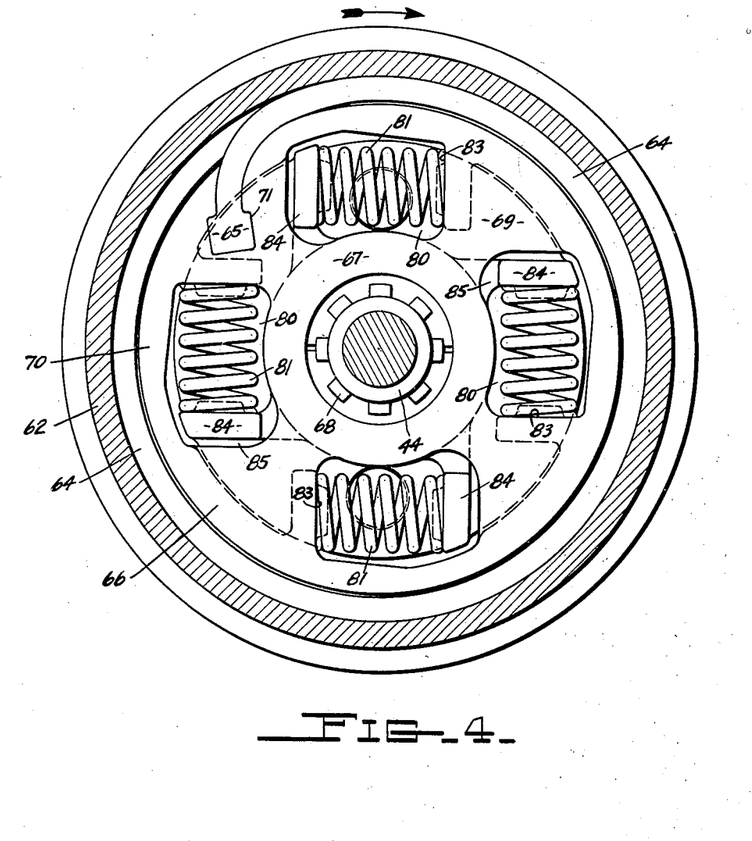
Figure 4 is a view taken on line 4—4, Figure 3.
Figure 5:
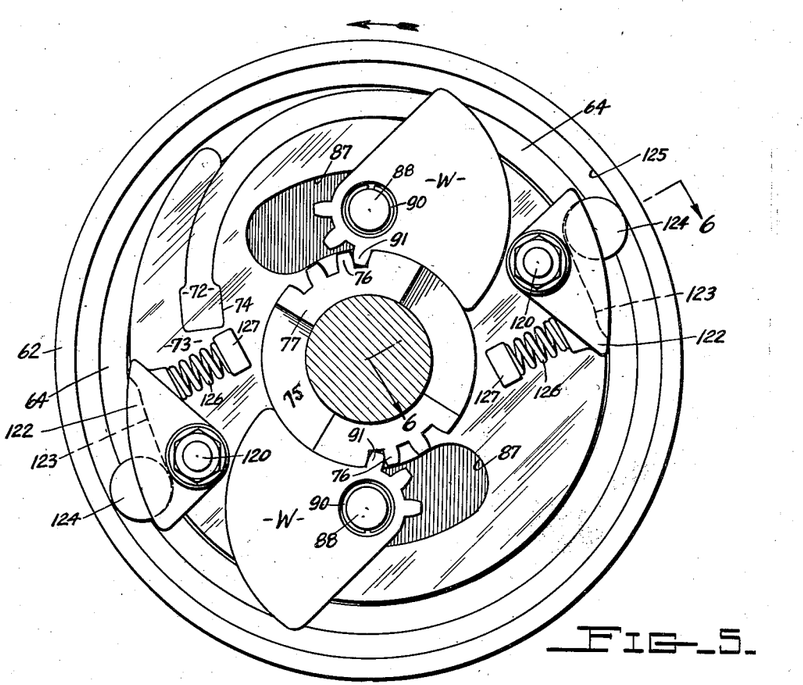
Figure 5 is an end elevation looking to the left in Figure 3.

The drum 62, which is rotating in the direction of the arrow, Figure 5, transmits its movement through coil 64 to disc 73 and from there the movement is transmitted through hub 75, gear teeth 76, 91 to the weights W which are in their depressed position. The action of the drive through teeth 76, 91 tends to rotate the weights in a clockwise direction, Figure 5, around their pins 88 and thus to move the pins 88 in a clockwise direction, Figure 5, around the axis of the clutch. Since however the weights are in their depressed position and prevented from clockwise movement around their pins by their butting against the hub 75 of the disk 73, the disk 73, weights W, pins 88 and ring 85 rotate as a unit and drive the driven member 66 which is splined to intermediate shaft 44, in the direction of the arrow in Figure 4, through compression springs 81. These springs 81 are normally under slight compression and force driven member 66 and disk 73 in opposite directions to expand clutch member or coil 64 to engage the drum 62, and oppose disengagement of the clutch.

If both drive torque and load torque are great enough to overcome the force of springs 81, a relative movement between disk 73 and driven member 66 will result and coil 64 will be wound up or contracted, disengaging the clutch.

If, due to centrifugal action, the weights W fly out, the pins 88 will move through their slots 87 in a counterclockwise direction, Figure 5, rotating ring 85 relative to disk 73 in a clockwise direction, Figure 4, effecting a partial compression of the coil springs 81. This partial compression of the springs 81 however does not cause any relative movement between the disk 73 and driven member 66 to disengage the clutch, but increases the force of the springs 81 in their opposition to disengagement of the clutch.

*Clutch B*

A sleeve 100 is rotatably mounted upon the intermediate shaft 44 and is provided at one end with jaw clutch sections complemental to the clutch sections 77 formed on the end of the hub 75. When the respective parts of the transmission are assembled, these clutch faces are engaged. The member 73 and the sleeve 100 could be formed integral. They are here shown as separate parts provided with the complemental engaged clutch faces in order to provide greater ease in assembly of the respective parts of the transmission.

Clutch B includes substantially the same construction, and the same parts as those previously described in clutch A. A driving section or drum 101 is rotatably mounted upon the sleeve 100 and provided with an elongated hub portion 102 on which is rotatably mounted the intermediate or second gear 60. The gear 60 is connected to the drum 101, or the hub thereof, through means of an over-running clutch 103. The over-running clutch 103 is so designed that when the drum 101 is stationary, and the gear 60 is rotated counter-clockwise looking to the left Figure 1, the gear becomes connected with the drum 101.

104 designates a clutch member or coil similar to coil 64 in clutch A, and having one end secured to a driven member 105 which is an integral part of the sleeve 100. The opposite end of the coil 104 is connected to a member or disk 106 which corresponds in structure to disk 73 of clutch A, and which is similarly formed with a hub portion 107 provided with gear teeth 108. An element or ring 109 is interposed between the driven member 105 and disk 106, and is similar in structure to ring 85, the disk 106 being provided with slots complemental to the slots 87 in disk 73 and through which bosses formed on ring 109 project, and carry the studs or pins 110. Weights 111 are rotatably mounted upon the outer ends of the pins 110 and are provided with gear teeth which mesh with the teeth 108. The weights 111 act in the same manner as the weights W in clutch A to effect, through centrifugal action, relative movement of the disk 106 and ring 109. The driven member 105 is provided with a plurality of recesses in which are located helical compression springs 112, and the ring 109 is provided with projections which extend into the recess and against which one end of the compression springs 112 acts, the other ends acting against the end walls of the recesses in driven member 105. The function of the coil springs 112 is similar to the function of coil springs 81 in clutch A. That is, they tend to expand the coil 104 causing it to engage the inner surface of the drum 101. The outer end of the hub 107 is also formed with jaw clutch members as is the bushing 115 as indicated at 116. The bushing 115 is rotatably mounted upon the intermediate shaft 4, and carries the low gear 61 which is connected thereto through means of an over-running clutch 117 acting in manner similar to the clutch 103 in gear 60.

The operation of clutches A and B as described, will now be explained. Assuming the car is at a standstill and the main clutch is engaged connecting the stud shaft 22 with the crank shaft of the motor which is rotating and delivering torque. The drive is now through stud shaft 22, drum 62, coil 64, member 73 through gear teeth 76, 91, weight W, pin 88 to ring 85 and from there through springs 81 to the driven member 66, intermediate shaft 44, clutch members 46, 48, to tail shaft 36. Inasmuch as the car is at a standstill and the reactionary torque thereof is considerable, the force exerted on the coil 64 by the engine torque effects partial compression of the coil springs 81. The disk 73 will move relative to the driven member 66, thus winding up or contracting the coil 64 out of engagement with the drum 62, disengaging the clutch A, and since the vehicle is still at a standstill, the second gear 60 will immediately act through roller clutch 103 on the drum 101 of the clutch B. The motor will now tend to drive the intermediate shaft 44 through the intermediate or second speed reduction gearing with the higher torque obtained thereby and will assert its increased torque through gear 60, roller clutch 103, drum 101, coil 104, disk 106, gear teeth 108, weight 111, pins 110, intermediate ring 109, compression springs 112 to driven member 105, from which the torque is transmitted through sleeve 100, jaw clutch 77 to the clutch disk 73 and from there as described above through the driven section of clutch A to the driven member 66 and the intermediate shaft 44.

It will be noted that by making the driven member 66 the only clutch part connected to the intermediate shaft 44, the torque transmitted by the second gear 60 must go through the driven parts of clutch A, thereby keeping or holding clutch A disengaged, while the torque of the motor is transmitted through the second gear. Since the torque transmitted through the second gear is higher than the torque delivered by the motor directly, this torque is sufficient to keep clutch A disengaged.

If now the torque load is still higher than the torque transmitted by the motor through the second gear, clutch B will also be disengaged and the motor will transmit its torque through the low gear 61, roller clutch 117, hub 115, jaw clutch 116 to the member 106 of clutch B, and then through the driven parts of clutches B and A as described above to the intermediate shaft 44, while at the same time the torque transmitted through the low gear holds clutches A and B disengaged. Clutch drum 101 idles on sleeve 100 while the drive is through low gear.

Now the transmission is in low gear and the car begins to move. The compression springs 112 are preferably stronger than compression springs 81, and therefore as soon as the car gathers momentum and the load torque decreases, springs 112 will expand, reengaging clutch B, and the drive will then be through second gearing. If the load torque continues to decrease, it will finally reach a point where the springs 81 will have sufficient power to expand and thus reengage clutch A and the torque of the motor will then be transmitted to the driven shaft in direct drive.

If at any time thereafter, while the car is moving below a certain speed, the driven shaft load becomes sufficient to compress springs 81, clutch A will be disengaged and the drive will be through second gear and if then the driven shaft load is sufficient to compress springs 112, clutch B will become disengaged and the drive will be through low gear, and after that will shift back to second and direct as described above, depending on the load on the driven shaft.

The operation of the transmission has so far been described as depending on torque alone and the effect of the car speed on the operation of the transmission will now be described in connection with the graph, Figure 9.

Figure 9:
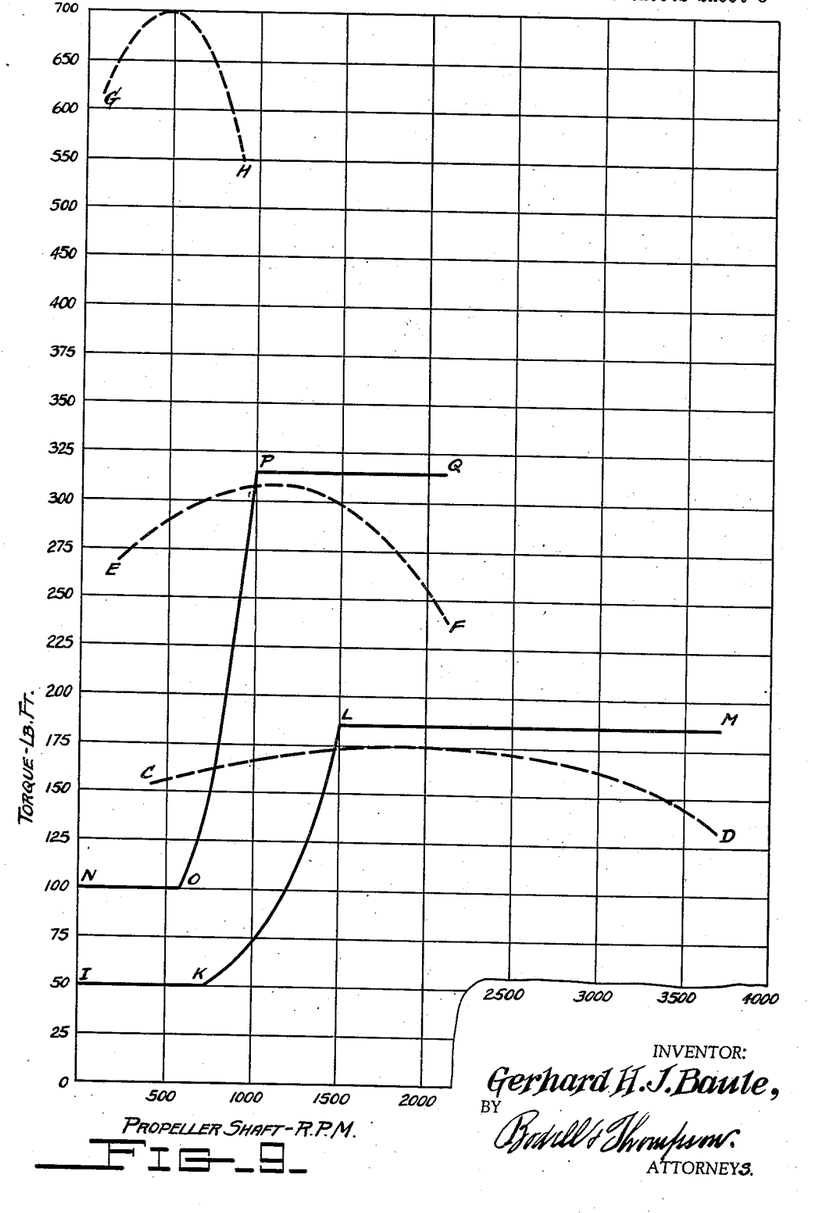
Figure 9 is a view illustrating graphically the operation of my transmission at various speeds and torque loads.

In Figure 9, which is representative of a torque-speed diagram of my transmission, the horizontal lines represent the torque in foot pounds delivered to the driven shaft, and the vertical lines represent the speed in R. P. M. of the driven, or propeller shaft. Hereafter foot pounds will be designated by the conventional symbol lb. ft.

Curve CD shows how much torque the motor is able to deliver to the propeller shaft in direct drive, at speeds ranging from idling to maximum speed of the motor. Curve EF shows the maximum torque delivered through second gearing, and curve GH the maximum torque delivered through low gearing at speeds of the propeller shaft ranging from minimum to maximum, as resulting from the drive of the motor through second and low gearing. Curves EF and GH represent theoretical values based on the torque curve CD of an actual motor and are computed in accordance with the ratios of second and low gearing without taking into consideration any losses caused in the reduction gearing.

Curve IKLM represents the torque-speed values at which clutch A will be disengaged, and curve NOPQ represents the torque-speed values at which clutch B will be disengaged by the torque transmitted through these clutches. In other words, if the torque transmitted in direct drive stays below curve IKLM, the direct drive will be maintained; if it goes above that curve, clutch A will be disengaged and the drive transmitted through second gearing. If the torque transmitted through second gearing stays below curve NOPQ, the drive will be maintained through second gearing, and if the torque goes above that curve, the drive will be through low gearing.

As described before clutch A disengages when the torque transmitted through it causes relative movement of disk 73 and driven member 66 against the force of compression springs 81, which tend to keep the clutch engaged. As shown in curve IKLM a torque of 50 lb. ft. is required to overcome the initial compression or force of springs 81 opposed to the disengagement of clutch A at speeds up to about 750 R. P. M. of the propeller shaft.

When the speed goes above 750 R. P. M. the weights W fly radially outward under the action of centrifugal force and cause a movement of ring 85 relative to disk 73 compressing the springs 81 so that at 1500 R. P. M. of the propeller shaft a torque of about 180 lb. ft. is required to still further compress springs 81 to cause disengagement of clutch A. At 1500 R. P. M. the weights reach their most outward position and no further compression of springs 81 by the action of the weight is possible, even though the speed may increase above 1500 R. P. M.

The disengagement of clutch B is controlled by torque and speed in the same manner as clutch A as is apparent from curve NOPQ. The torque required to overcome the initial force of compression springs 112 is 100 lb. ft. at speeds up to 600 R. P. M. of the propeller shaft. If the speed goes above 600 R. P. M. a greater torque is required, until the speed reaches 1000 R. P. M. when a torque of about 315 lb. ft. is required to disengage clutch B.

It will be noted from these curves that the forces opposing disengagement of clutch A become equal to the maximum motor torque when the propeller shaft is rotating at a speed of about 1450 R. P. M. At any speed above 1450 R. P. M. it will not be possible to disengage clutch A because the torque required to do so is higher than the maximum motor torque. The same holds true with regard to clutch B which can not be disengaged at any speed of the propeller shaft of above 1000 R. P. M.

If however clutch A has become disengaged before the speed of 1450 R. P. M. is attained, the drive will remain through second gearing even though the propeller shaft speed goes above 1450 R. P. M., provided the torque transmitted through second gearing is sufficient to resist the forces exerted by springs 84 at speeds above 1450 R. P. M. The torque delivered by the motor of course depends on the position of the throttle or accelerator pedal, controlled by the operator.

Thus it will be observed that the drive can not be changed from direct to second, or from second to low after a certain car speed has been reached and furthermore, that the maximum speed obtainable through second gearing can be utilized for acceleration or hill climbing without the ratio changing to direct drive.

In operation, when starting from a standstill, the torque transmitted through clutch A will release this clutch when it reaches the value of 50 lb. ft. and if the torque transmitted through second gear reaches 100 lb. ft. clutch B will be released and the car will start in low gear with a maximum torque available as represented by curve GH. The car may be accelerated in low gear until the maximum propeller shaft speed in low gear of about 900 R. P. M. is obtained. After that the load torque will decrease due to the car having gathered momentum until it is overcome by the forces of springs 112 at a torque of about 230 lb. ft., when clutch B is reengaged, changing the ratio to second gear.

The reengagement of clutch B is not instantaneous but is intermittent until the propeller shaft speed, which in this instance is maximum low gear speed, and the speed of the second ratio gear 60 and clutch drum 101 are equal.

From Figure 9 it is apparent that when the propeller shaft rotates in low gear at 900 R. P. M., the clutch drum 101 which is connected to the second ratio gear 60 rotates at about 2200 R. P. M. Thus, when coil 104 engages drum 101, the drum tends to accelerate the propeller shaft instantaneously. The load reaction however does not allow this and therefore the torque transmitted through clutch B will again disengage the clutch and this cycle of engaging and disengaging will be repeated until the speeds of drum 101 and the propeller shaft are synchronized. After that clutch B will stay engaged provided the torque transmitted is less than the torque required to disengage the clutch. The action of the parts of the driven section of clutch B during this intermittent drive is as follows:

When the load torque decreases to a point where springs 112 will be allowed to expand, a movement of driven member 105 relative to disk 106 will result and as the ends of coil 104 are anchored to driven member 105 and disk 106 respectively, this coil will expand into engagement with drum 101. Coil 104 has a slight spring action which tends to equalize the diameter of the several windings of the coil and thereby all windings will expand uniformly and contact the inner surface of drum 101 simultaneously.

When the drive through second ratio gear 60 and drum 101 tends to accelerate the propeller shaft faster than the load will permit, the propeller shaft will cause driven member 105 to lag behind disk 106, compressing springs 112 and contracting coil 104. As described before, the movement of drum 101 is transmitted through coil 104 to disk 106 and from there through springs 112 to driven member 105. Therefore, if driven member 105 lags behind disk 106, the coil 104 will be wound up or contracted, beginning with the winding at the left end of coil 104, as seen in Figure 1, and contracting winding after winding of coil 104 until the friction between the remainder of the windings that are still engaged and drum 104 is insufficient to transmit the torque. In the moment these last windings begin to slip, all windings will equalize in diameter and thus all windings will be momentarily disengaged and will then simultaneously reengage as described above. The frequency of the intermittent engagement and disengagement cycle depends on the difference in speed between drum 101 and the propeller shaft.

This intermittent driving period may be shortened or entirely eliminated, if the operator, after obtaining maximum speed in low, eases up on the accelerator pedal, thus slowing down the engine and synchronizing the speeds of drum 101 and the propeller shaft.

When the torque transmitted by the second ratio gear 60 through reengaged clutch B, and the driven section of still disengaged clutch A, decreases to such an extent that compression springs 81 can again expand, then clutch A will be reengaged and the drive will be direct.

Since clutches A and B are of similar construction, clutch A will be intermittently engaged and disengaged in the same manner as clutch B while the speeds of the driving shaft and the propeller shaft differ, and while the torque transmitted through the driven section of clutch A is not sufficient to hold the clutch disengaged. It will be noted however that this momentarily intermittent drive through clutch A can take place only if the propeller shaft speed does not increase the force of the compression springs 81 to such an extent that the maximum motor torque at that propeller shaft speed is unable to overcome the opposition of these springs.

Referring to Fig. 9 for instance it will be apparent that, if the propeller shaft is rotated in second gear at the maximum speed obtainable in that gear, in this case about 2200 R. P. M., the springs 81 tend to reengage clutch A with a force as indicated by the portion LM of curve IKLM whereas the motor torque at the corresponding drive shaft speed of about 3700 R. P. M. as indicated by D on curve CD tending to disengage clutch A is considerably less. If therefore clutch A becomes reengaged at the maximum propeller shaft speed in second gear, the clutch will stay engaged and will tend to slow down the motor very suddenly, whereby the motor may be stalled.

In order to avoid this danger, clutch A has been provided with a lock for keeping clutch A disengaged, and the lock will now be described in connection with Figures 5, 6, 7, 8 and 9.

Figure 6:
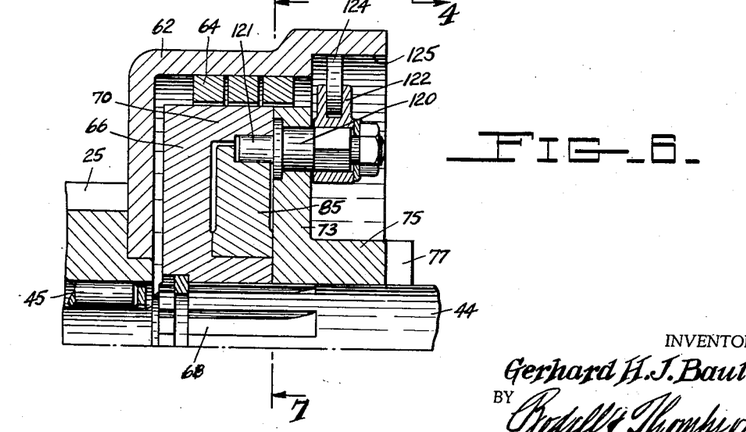
Figure 6 is a view taken on line 6—6, Figure 5.
Figure 7:
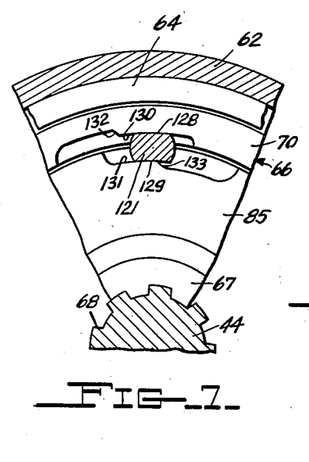
Figure 7 is a view taken on line 7—7, Figure 6.
Figure 8:
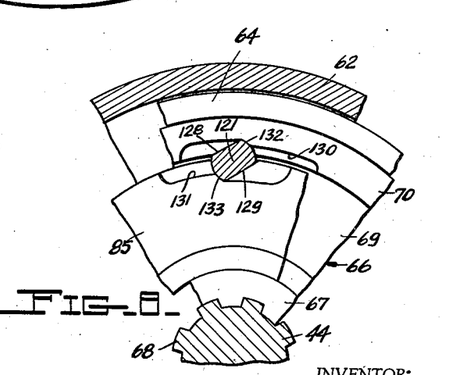
Figure 8 is a view, similar to Figure 7, showing the lock in operated position.

A pin 120 is rotatably mounted in the disk 73 and has an extension 121 on its inner or left end as seen in Fig. 6, projecting into a passage formed partially in drum 70 of driven member 66 and partially in ring 85. The outer end of pin 120 has secured thereto an arm 122 provided with a cam groove 123 and carrying therein a roller 124, the periphery of which is in contact with inner concentric surface 125 of drum 62. A compression spring 126, one end of which abuts a projection 127 on the disk 73, presses with its other end against the arm 122, tending to rotate it and pin 120 with extension 121 in a counterclockwise direction, as seen in Figures 5, 6 and 7. The extension 121 of pin 120 is provided with substantially flat surfaces 128 and 129 which normally contact complemental surfaces 130, 131 on drum 70 and ring 85 respectively. Contact between two complemental surfaces prevents rotation of the pin 120. A shoulder 132 at the end of surface 130, and a similar shoulder 133 at the end of surface 131, are provided to butt against the periphery of extension 121 when pin 120 is rotated in counter-clockwise direction.

In operation, when the member 66, of which drum 70 is an integral part, moves relative to disk 73, in which pin 120 is rotatably mounted, the shoulder 132 moves to the right as seen in Figure 7 until it passes over the pin extension 121, and if the pin is allowed to rotate in a counter-clockwise direction, the periphery of the extension 121 will butt against the shoulder 132 and lock driven member 66 against returning to its original position relative to disk 73. The pin 120 however is prevented from such rotation by the surface 129 of the extension 121 contacting surface 131 on the ring 85. Only if, at the same time that driven member 66 moves relative to disk 73 due to the torque transmitted through the driven section of clutch A by the drive in second gear, the speed of the propeller shaft is sufficient to cause a movement of ring 85 relative to disk 73, only then will both shoulders 132 and 133 pass over pin extension 121 and the pin 120 will be permitted to rotate and lock driven member 66, ring 85 and disk 73 from relative movement and thus lock clutch A against reengagement. Clutch A being locked in disengaged position creates a condition where there is no positive connection between driving and driven shaft; this condition is in the automobile trade called "free wheeling".

When pin 120 rotates in a counter-clockwise direction Figure 5, under the action of spring 126, the cam track of the cam groove 123 takes an inclined position relative to the internal surface 125 of drum 62 with the roller 124 in the position relative to arm 22 as shown in Figure 5. The surface 125 of drum 62 rotates in the direction of the arrow at engine speed whereas the locking mechanism rotates with disk 73 and the other parts of the driven section of clutch A at second gear speed or slower than the surface 125. The centrifugal force will keep roller 124 in contact with surface 125 and if the operator eases up on the accelerator to slow down the motor, and with it drum 62, until its speed substantially synchronizes with the propeller shaft speed, the surface 125 will cause roller 124 to move relative to disk 73 in a direction opposite to the arrow in Figure 5 and the roller will force the arm 122 to rotate in a clockwise direction, thereby releasing the lock and engaging clutch A.

Preferably, two locking mechanisms in a diametrically opposite position are provided on disk 73 in order that the assembly may be balanced. Both locking mechanisms operate in unison.

Thus it will be seen that, when in the specific case illustrated in Figure 9, the drive is through second gearing and the propeller shaft speed goes above 1450 R. P. M., the lock will operate to prevent reengagement of clutch A as long as the speed of the drive shaft exceeds the speed of the propeller shaft, but in the moment the operator slows down the speed of the engine to synchronize with the speed of the propeller shaft, clutch A will become engaged and the drive will be in direct or high.

Obviously, the operator of the vehicle may also control the intermittent engagement and disengagement of clutch A by manipulation of the engine throttle, as in the case of clutch B.

It is to be understood that the curves shown in Figure 9 and the values referred to are for purposes of illustration only without restricting the scope of the invention to these specific characteristics. The operating characteristics of the transmission may be modified by the size and formation of the springs 81, 112, and the weights 111. It will be understood that the structure of the transmission may be changed and modified in various sizes to meet the requirements of various uses to which the transmission may be put. The embodiment here shown and described is an automatic change speed transmission for automotive vehicles. However, it is obvious by modifying the structure the transmission could be used for innumerable purposes.

What I claim is:

1. In a transmission mechanism, driving and driven shafts, a normally engaged clutch connecting the shafts and including a driving section connected to the driving shaft, a driven section having a member connected to the driven shaft, and a section movable relative to the first section, said clutch also including a clutch member connected to the members of the driven section and operable, upon relative movement of said members, to engage the driving section, and to disengage from the driving section when the torque transmitted through the mechanism reaches a predetermined value, spring means tending to move said sections of the driven section relatively to effect engagement of the clutch member with the driving section, and means operated by the speed of the driven shaft to increase the force of the spring means as the speed of the driven shaft increases.

2. In an automatic transmission, a drive shaft, a driven shaft, a clutch for connecting the shafts in a high speed ratio including means operable by the load on the driven element to disengage the clutch, resilient means opposing disengagement of the clutch, means for connecting the shafts in a low speed ratio, means for disconnecting the low speed means when the clutch is engaged, and centrifugal weights acting on said resilient means to vary the resiliency thereof.

3. In an automatic transmission, a drive shaft, a driven shaft, a clutch for connecting the shafts in a high speed ratio including means operable by the load on the driven element to disengage the clutch, resilient means for engaging said clutch, means for connecting the shafts in a low speed ratio, means for disconnecting the low speed means when the clutch is engaged, and centrifugal means acting on the resilient means to strengthen the same.

4. In an automatic transmission, a drive shaft, a driven shaft, a clutch for connecting the shafts in a high speed ratio including means operable by the load on the driven shaft to disengage the clutch, resilient means opposing disengagement of the clutch, means for connecting the shafts in a low speed ratio, means for disconnecting the low speed means when the clutch is engaged, centrifugal weights acting on said resilient means to vary the resiliency thereof, and connections between the low speed means and the clutch for holding the clutch disengaged when the drive is through the low speed means.

5. In an automatic transmission, a drive shaft, a driven shaft, a clutch for connecting the shafts in a high speed ratio including means operable by the load on the driven shaft to disengage the clutch, resilient means opposing disengagement of the clutch, centrifugal weights acting on said resilient means to vary the resiliency thereof, means for connecting the shafts in a low speed ratio, means for disconnecting the low speed means when the clutch is engaged, means for locking the clutch in disengaged position, and means responsive to the relative movement between the drive and driven shafts when the driven shaft rotates faster than the drive shaft for unlocking the locking means.

6. In a transmission mechanism, driving and driven shafts, a normally engaged clutch connecting the shafts and including a driving section connected to the driving shaft, a driven section having a member connected to the driven shaft, and a member movable relative to the first member, said clutch also including a clutch member connected to the members of the driven section and operable, upon relative movement of said members, to engage the driving section, and to disengage from the driving section when the torque transmitted through the mechanism reaches a predetermined value, spring means tending to move said members of the driven section relatively, and locking means operable to lock said members against relative movement after said members have moved relatively to disengage the clutch member from the driving section.

7. In a transmission mechanism, driving and driven shafts, a normally engaged clutch connecting the shafts and including a driving section connected to the driving shaft, a driven section having a member connected to the driven shaft, and a member movable relative to the first member, said clutch also including a clutch member connected to the members of the driven section and operable, upon relative movement of said members, to engage the driving section, and to disengage from the driving section when the torque transmitted through the mechanism reaches a predetermined value, spring means tending to move said members of the driven section relatively, locking means operable to lock said members against relative movement after said members have moved relatively to disengage the clutch member from the driving section; and means acting on the locking means and responsive to the relative movement between the driving and driven sections when the driven section rotates faster than the driving section for unlocking the locking means.

8. In an automatic change speed transmission, the combination of a drive shaft, a driven shaft, change speed gearing between said shafts, a plurality of clutch means operable to successively establish drive connection between the drive and driven shafts at various ratios, each clutch means including means operable by the load on the driven shaft to disengage the clutch means and also including spring means for yieldingly resisting disengagement of the clutch means, and centrifugal means associated with each clutch means for varying the resistance of the spring means included in the respective clutch means.

GERHARD H. J. BAULE.

CERTIFICATE OF CORRECTION.

Patent No. 2,065,040. December 22, 1936.

GERHARD H. J. BAULE.

It is hereby certified that error appears in the printed specification of the above numbered patent requiring correction as follows: Page 6, second column, lines 17 and 17-18, claim 1, for the word "section" read member; line 25, same claim, for "sections" read members; and that the said Letters Patent should be read with these corrections therein that the same may conform to the record of the case in the Patent Office.

Signed and sealed this 9th day of March, A. D. 1937.

Seal)

Henry Van Arsdale
Acting Commissioner of Patents.